US012641531B2

(12) United States Patent
Guduru et al.

(10) Patent No.: US 12,641,531 B2
(45) Date of Patent: May 26, 2026

(54) SYSTEM AND METHOD FOR STEERING NETWORK TRAFFIC FOR MULTIPLE CORE NETWORKS

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Raquel Morera Sempere, Weehawken, NJ (US); Ambreen Habib, Golden, CO (US); Sylvestre Demonget, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 375 days.

(21) Appl. No.: 18/193,881

(22) Filed: Mar. 31, 2023

(65) Prior Publication Data

US 2024/0334318 A1     Oct. 3, 2024

(51) Int. Cl.
| | |
|---|---|
| *H04W 48/18* | (2009.01) |
| *H04W 28/02* | (2009.01) |
| *H04W 28/08* | (2023.01) |
| *H04W 40/12* | (2009.01) |
| *H04W 40/24* | (2009.01) |
| *H04W 76/15* | (2018.01) |

(52) U.S. Cl.
CPC ....... *H04W 48/18* (2013.01); *H04W 28/0268* (2013.01); *H04W 28/0967* (2020.05); *H04W 40/12* (2013.01); *H04W 40/248* (2013.01); *H04W 76/15* (2018.02)

(58) Field of Classification Search
CPC ............. H04W 48/18; H04W 28/0268; H04W 28/0967; H04W 40/12; H04W 40/248; H04W 76/15
See application file for complete search history.

(56) References Cited

U.S. PATENT DOCUMENTS

| | | | |
|---|---|---|---|
| 10,841,974 B1 * | 11/2020 | Young | H04W 76/30 |
| 2020/0275357 A1 * | 8/2020 | Bordeleau | H04L 41/0806 |
| 2023/0319528 A1 * | 10/2023 | Pateromichelakis | H04W 4/44 455/420 |
| 2025/0168758 A1 * | 5/2025 | Duan | H04W 24/10 |

* cited by examiner

*Primary Examiner* — Mandish Randhawa

(57) ABSTRACT

A system may comprise one or more devices in a network. The devices may be configured to: receive network slice performance data; and determine whether a network slice to which a User Equipment (UE) device is connected meets one or more criteria based on the network slice performance data. When the network slice does not meet the one or more criteria, the one or more devices may identify a different network slice that meets the one or more criteria; obtain an application identifier (app ID) or a traffic descriptor from a UE Route Selection Policy (URSP) rule whose slice ID matches a slice ID of the different network slice; and send the app ID or the traffic descriptor to the UE device.

20 Claims, 8 Drawing Sheets

CLIENT
RECORD
600

| | ORIG APP ID 604-1 | SLICE ID 606-1 | PSEUDO APP ID 608-1 | REPLACEMENT SLICE ID 609-1 | MODIFIED 610-1 |
|---|---|---|---|---|---|
| | ORIG APP ID 604-2 | SLICE ID 606-2 | PSEUDO APP ID 608-2 | REPLACEMENT SLICE ID 609-2 | MODIFIED 610-2 |
| UE ID 602 | • • • | • • • | • • • | • • • | • • • |
| | ORIG APP ID 604-T | SLICE ID 606-T | PSEUDO APP ID 608-T | REPLACEMENT SLICE ID 609-T | MODIFIED 610-T |

SLICE BINDING 400 →

| 402 ORIGINAL APP ID | 404 PSEUDO APP ID/ TRAFFIC DESCRIPTOR |
|---|---|

UE 102 →

APPLICATION 302

CLIENT 304

APP INFO DB 306

OPERATING SYSTEM 308

MODEM 310

URSP RULES DB 312

SWORD 106 →

KNIFE 502 [ AI 503 ]   BLADE 510   SLICE PERF DB 506   URSP RULES DB 508

SLICE BINDINGS DB 504

CLIENT RECORD 600 →

| UE ID 602 | ORIG APP ID 604-1 | SLICE ID 606-1 | PSEUDO APP ID 608-1 | REPLACEMENT SLICE ID 609-1 | MODIFIED 610-1 |
| | ORIG APP ID 604-2 | SLICE ID 606-2 | PSEUDO APP ID 608-2 | REPLACEMENT SLICE ID 609-2 | MODIFIED 610-2 |
| | • • • | • • • | • • • | • • • | • • • |
| | ORIG APP ID 604-T | SLICE ID 606-T | PSEUDO APP ID 608-T | REPLACEMENT SLICE ID 609-T | MODIFIED 610-T |

CORE NETWORK⟶
204

RECEIVE URSP RULES; STORE URSP RULES 802

REGISTER 804

RECEIVE AND STORE TELEMETRY INFO 806

DETERMINE PSEUDO APP IDS OR TRAFFIC DESCRIPTORS; PERFORM REVERSE LOOKUP 808

SEND UPDATED SLICE BINDINGS 810

ESTABLISH PDU SESSION 812

800

1000 →

SYSTEM AND METHOD FOR STEERING NETWORK TRAFFIC FOR MULTIPLE CORE NETWORKS

BACKGROUND INFORMATION

Machine learning (ML) relates to an aspect of artificial intelligence. In contrast to systems that perform tasks based on explicit instructions (i.e., programs), an ML system may improve its performance of a task based on training data. Examples of ML systems include: a deep learning or reinforcement learning neural network; a clustering (K-means clustering) system; and a decision tree builder (e.g., a random forest building system). Examples of tasks that ML systems perform include: classifications of images; speech recognition; and controlling an autonomous vehicle. ML systems can be adapted for many purposes, such as managing portions of networks.

DETAILED DESCRIPTION

The following detailed description refers to the accompanying drawings. The same reference numbers in different drawings may identify the same or similar elements. As used herein, the terms "service provider" and "provider network" may refer to, respectively, a provider of communication services and a network operated by the service provider. The term "partner" may refer to an entity different from a service provider. A partner may access a provider network operated by the service provider under a business agreement or a contract. In addition, the term "public network" may refer to a cellular network that is available for use or subscription by a general public, and the term "private network" may refer to a cellular network that is available to members of a private organization. A private network and a public network may be operated by the same entity or different entities. A private network may be coupled to a portion of the public network, such as an access network.

Systems and methods described herein relate to steering network traffic for multiple core (multicore) networks. Traffic steering relates to dynamically influencing the traffic on different data networks and network slices based on network operating conditions. This includes causing a mobile device (e.g., a smart phone) wirelessly attached to a multicore network or an application on the mobile device to terminate its connection to one network slice or one data network and connect to a different network slice or a different data network. The systems may use a machine learning (ML) component to learn to select a different network slice or data network for optimizing network performance. By having the application on the mobile device receive its services from a different network slice or data network, the system may allow the network to continue providing satisfactory network services to the mobile device despite changing network operating conditions.

Figure 1:
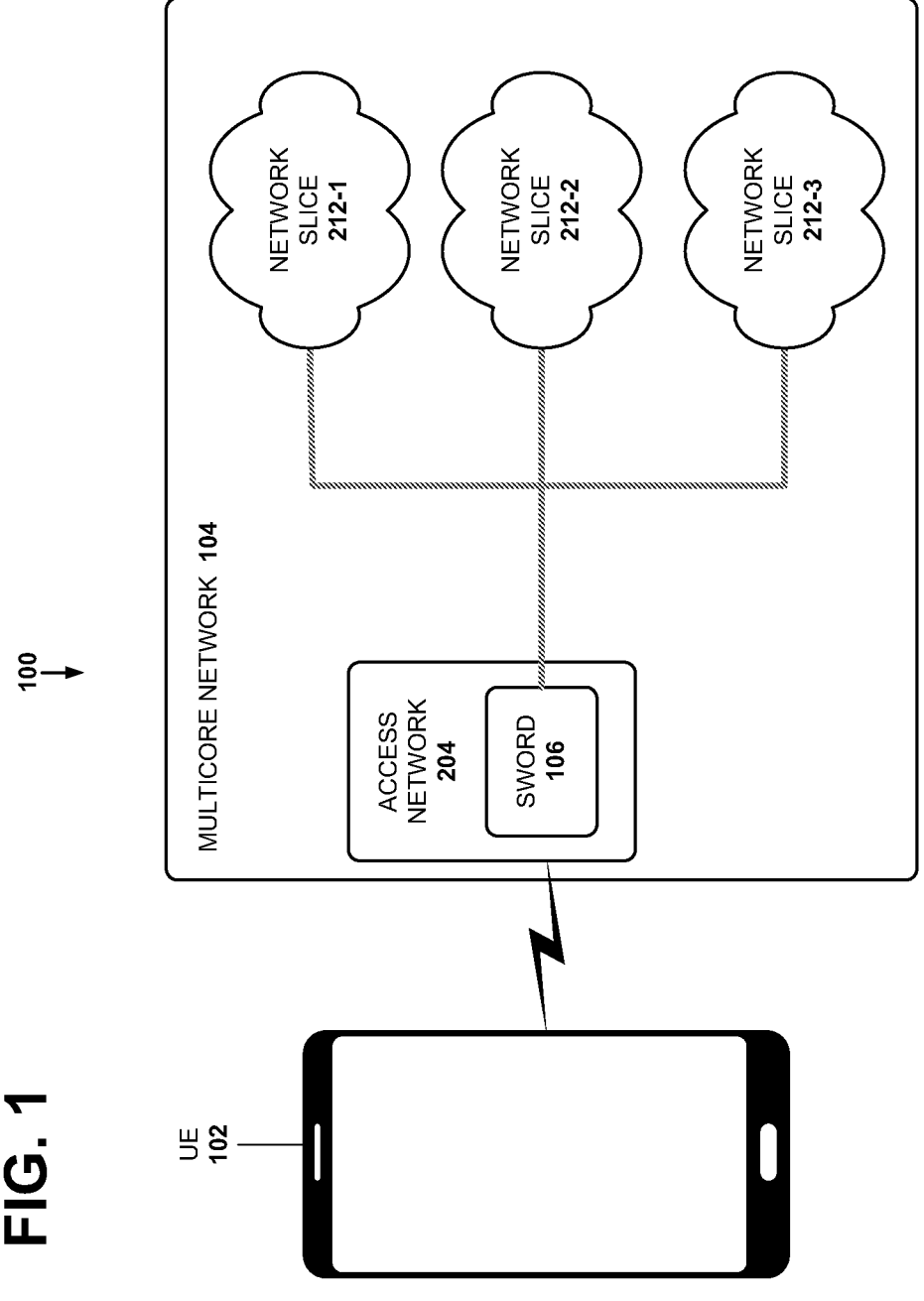
FIG. 1 illustrates an overview of a system for steering network traffic for multiple core (multicore) networks, according to an implementation.

FIG. 1 illustrates an overview of an exemplary system 100 for steering network traffic for a multicore network, according to an implementation. As shown, system 100 may include a User Equipment device (UE) 102 (e.g., a smart phone) and a multicore network 104. Multicore network 104 may include an access network 204 (e.g., a radio access network (RAN)) that includes a Slice-Weighted Optimum Route Dealer (SWORD) 106 and network slices 212-1 through 212-3 (collectively referred to as network slices 212 and generically as network slice 212). UE 102, access network 204, SWORD 106, and network slices 212 are described in greater detail with reference to FIG. 2.

Assume that an application running on UE 102 establishes a session with a network slice 212-2 to receive a communication service (e.g., an Internet access service, a communication service (e.g., Voice-over-IP service), etc.). Also assume that, over time, network operating conditions change and that network slice 212-2 becomes congested while network slice 212-1 remains uncongested.

SWORD 106 may track what application running on UE 102 is in a session with which network slice 212, as well as monitor operating conditions of network slices 212. As UE 102 may not be able to monitor the real-time performance (e.g. potential user throughput, latency, jitter, etc.) variations of a given network slice 212, especially one that the UE 102 is not currently using, SWORD 106 may use its per-slice monitoring capability (and the dynamic slice selection intelligence that leverages it) for dynamic steering of network slice traffic.

When SWORD 106 detects significant changes in operating conditions of network slice 212-2, SWORD 106 may determine whether network slice 212-2 can continue to service the application on UE 102 in a satisfactory manner (e.g., whether operating parameters of network slice 212-2 meet the requirements of the Service Level Agreement (SLA) between the user of UE 102 and the service provider). If SWORD 106 determines that network slice 212-2 does not or cannot provide a satisfactory service, SWORD 106 may cause the application on UE 102 to terminate the current session with network slice 212-2 and establish a new session with a different network slice (e.g., network slice 212-1), which is capable of providing the service at an acceptable level. By connecting to a different network slice 212-1, the application may continue to receive satisfactory services from multicore network 104, without degradation (e.g., undue delays, interruptions, etc.).

Figure 2:
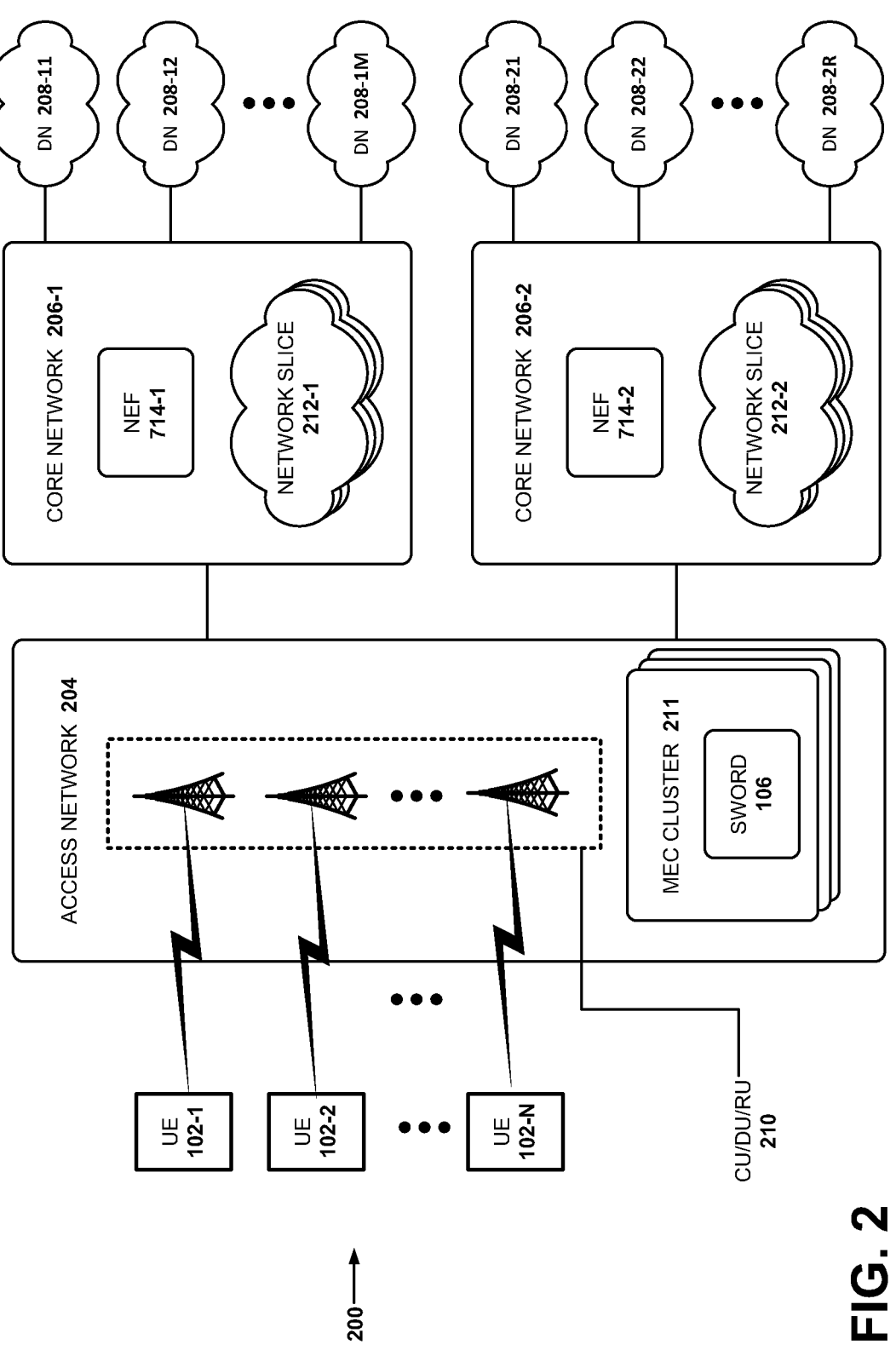
FIG. 2 illustrates an exemplary network in which systems and methods described herein may be implemented.

FIG. 2 illustrates an exemplary network environment 200 in which the system and methods may be implemented. As shown, environment 200 may include UEs 102-1 through 102-N (collectively referred to as UEs 102 and generically referred to as UE 102), access network 204, core networks 206-1 and 206-2 (collectively referred to as core networks 206 and generically as core network 206), and data networks (DN) 208-11 through 208-1M and 208-21 through 208-2R (collectively referred to as data networks 208 and generically as data network 208). Access network 204, core networks 206, and data networks 208 may be part of multicore network 104 (not shown in FIG. 2). As the term "multicore" indicates, multicore network 104 may include more than one core network, although only two core networks 206-1 and 206-2 are shown in FIG. 2. Examples of multicore network 104 include a Multi-Operator Core Network (MOCN), a Multi-Operator Radio Access Network (MORAN), and a Public Network Integrated-Non-Public Network (PNI-NPN).

UEs 102 may include wireless communication devices capable of Fifth Generation (5G) New Radio (NR) communication. Some UEs 102 may additionally include Fourth Generation (4G) (e.g., Long-Term Evolution (LTE)) communication capabilities. Examples of UE 102 include: a Fixed Wireless Access (FWA) device; a Customer Premises Equipment (CPE) device; a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor or; and an Internet-of-Things (IoT) device with Wi-Fi® capabilities. In some implementations, UE 102 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices. Some UEs 102 may subscribe to core network 206-1 and other UEs 102 may subscribe to core network 206-2.

Each UE 102 may include one or more applications that receive services from one or more network slices 212. In addition, UE 102 may include an application or a software component that communicates with SWORD 106 to receive updated data, herein referred to as slice-application bindings or simply slice bindings, that enable or cause an application on UE 102 to switch its connection from one network slice 212 to another network slice 212.

Access network 204 may allow UE 102 to access core network 206. To do so, access network 204 may establish and maintain, with participation from UE 102, an over-the-air channel with the customer devices; and maintain backhaul channels with core network 206. Access network 204 may relay information through such channels, from UEs 102 to core network 206 and vice versa. Access network 204 may include an LTE radio network and/or a 5G NR network, or another advanced radio network. These networks may include many central units (CUs), distributed units (DUs), radio units (RUS), and wireless stations, some of which are illustrated in FIG. 2 as CU/DU/RUs 210 (also referred to as access station 210) for establishing and maintaining over-the-air channel with UEs 102. In some implementations, access station 210 may include a 4G, 5G, or another type of base station (e.g., eNB, gNB, etc.) that comprises one or more radio frequency (RF) transceivers. In some implementations, access station 210 may be part of an evolved Universal Mobile Telecommunications Service (UMTS) Terrestrial Radio Access Network (eUTRAN).

As further shown, access network 204 may include one or more Multi-Access Edge Computing (MEC) clusters 211, Each MEC cluster 211 may include MEC devices arranged to provide redundancy. Each MEC device may be coupled to an access station 210 (or other RAN devices such as CU, DU, etc. Because of its proximity to access station 210 and therefore its proximity to UEs 102 attached to access station 210 via wireless communication links, the MEC devices may provide services to UEs 102 with minimal latency. As depicted in FIG. 2, MEC cluster 211 (or MEC devices in MEC cluster 211) may host SWORD 106.

SWORD 106 may include one or more software components that are hosted on MEC devices. For each application running on UE 102 that receives services from multicore network 104, SWORD 106 may track with which network slice 212 or data network 208 the application has a live connection. In addition, for each of the applications, SWORD 106 may determine a target network slice 212 or data network 208 with which the application should be connected to receive the desired level of service. If the current network slice 212 to which the application is connected differs from the target network slice 212, SWORD 106 may communicate with UE 102 to cause the application to switch its connection to the target network slice 212.

Core networks 206-1 and 206-2 may each include one or more devices and network components for providing communication services to UEs 102. For example, core network 206 may permit UEs 102 to attach to multicore network 104, establish sessions with devices in multicore network 104, and/or receive services from multicore network (e.g., receive content, access the Internet, conduct video conferences with other UEs 102 attached to multicore network 104. To deliver various services, core networks 206 may interface with other networks, such as data networks 208.

Depending on the implementation, core network 206 may include 5G core network components or 4G or LTE core network components. For example, core network 206-1 and 206-2 may include a Network Exposure Function (NEF) 714-1 and 714-2 (discussed below with reference to FIG. 7). NEF 714-1 may expose network component capabilities and events internal to corresponding core network 206-1 and/or data networks 208-1 to devices and network functions external to core network 206-1, including third party network functions. That is, NEF 714-1 may permit a device or a component external to core network 206-1 to access network functions, programs, or devices in core network 206-1. For example, SWORD 106 may request network slices 212-1 to provide network slice performance data through NEF 714-1. Because SWORD 106 is external to core network 206-1, SWORD 106 accesses network slices 212-1 through NEF 714-2. NEF 714-2 may function similarly as NEF 714-1 but with respect to core network 206-2. For example, SWORD 106 may access network slice performance data through NEF 714-2.

As further shown, core networks 206 may each include one or more network slices 212. Depending on the implementation, network slices 212 may be implemented within other networks, such as access network 204 and/or data network 208. Access network 204, core networks 206, and data networks 208 may include multiple instances of network slices 212. Each network slice 212 may be instantiated as a result of "network slicing," which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice 212 may be configured to meet a different set of requirements and may be associated with a particular Quality of Service (QOS) class, a type of service, 5G QoS Identifier (5QI), and/or a particular group of enterprise customers associated with communication devices. Network slices 212 may be capable of supporting enhanced Mobile Broadband (eMBB) traffic, Ultra Reliable Low Latency Communication (URLLC) traffic, Time Sensitive Network (TSN) traffic, Massive IoT (MIOT) traffic, Vehicle-to-Everything (V2X) traffic, High performance Machine Type Communication (HMTC) traffic, and other customized traffic, for example.

Each network slice 212 may be associated with an identifier, herein referred to as a Single Network Slice Selection Assistance Information (S-NSSAI) and/or a network slice instance ID. Each UE 102 that is configured to access a particular network slice may be associated with corresponding subscription data, stored in core network 206 for example, that includes the S-NSSAI corresponding to the network slice.

Data networks 208 may include one or more networks connected to core networks 206. In some implementations, a particular data network 208 may be associated with a data network name (DNN) in 5G and/or an Access Point Name (APN) in 4G. UE 102 may request a connection to data network 208 using a DNN or APN. Each data network 208 may include, and/or be connected to and enable communications with a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also referred to as application). An application may provide services for a program or an application running on UEs 102 and may establish communication sessions with UEs 102 via core network 206.

For clarity, FIG. 2 does not show all components that may be included in network environment 200 (e.g., routers, bridges, wireless access point, additional networks, additional access stations 210, NEFs 212, ADAPT systems 214, data centers, portals, etc.). Depending on the implementation, network environment 200 may include additional, fewer, different, or a different arrangement of components than those illustrated in FIG. 2. Furthermore, in different implementations, the configuration of network environment 200 may be different.

Figure 3:
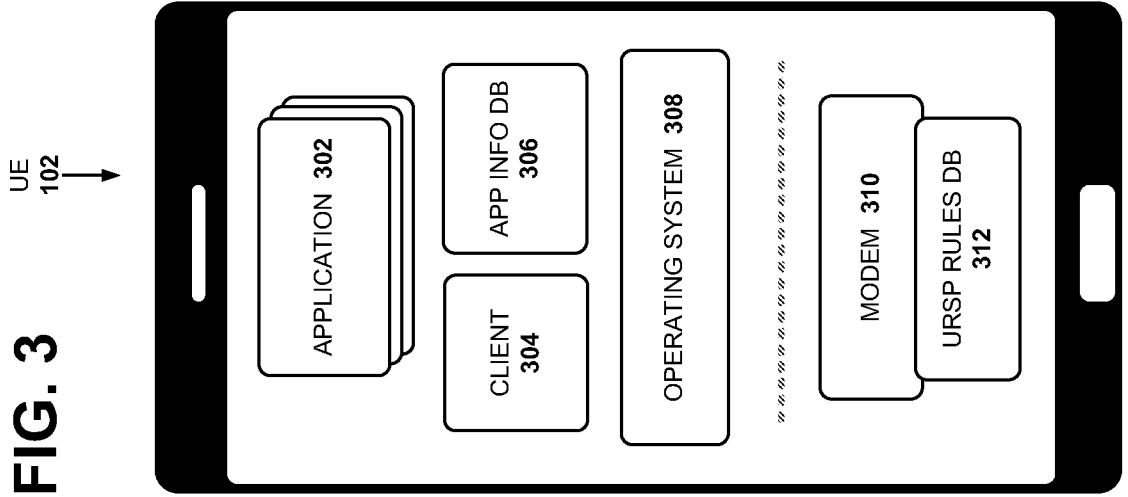
FIG. 3 depicts example components of a User Equipment device (UE) according to an implementation.

FIG. 3 depicts example components of a UE 102 according to an implementation. As shown, UE 102 may include one or more of application 302, a client 304 (a client to SWORD 106, an application information database (app info DB) 306, an operating system 308, a modem 310, and a UE Route Selection Policy (URSP) rules DB 312. Depending on the implementation, UE 102 may comprise other components or different components than those illustrated in FIG. 3.

Application 302 may include one or more software programs that run on UE 102. Application 302 may operate in conjunction with another program, also referred to as an application, in multicore network 104, network slice 212, or data network 208. Application 302 may include or be associated with an application ID or some other traffic descriptor. A traffic descriptor may include an app ID (or a pseudo app ID), a fully qualified domain name (FQDN), a DNN, etc. A traffic descriptor indicates a type of traffic that application 302 may exchange over a connection that it establishes with network slice 212 or data network 208 (e.g., a video stream, an audio stream, Internet traffic, etc.).

When application 302 initiates a connection to a network slice 212 or data network 208, application 302 invokes a call to lower layers of the system in UE 102, through client 304, operating system 308, and to modem 310. Any connection establishment acknowledgement or a response from an application on network slice 212 or data network 208 may arrive at modem 310 and flow through operating system 308 and client 304 to application 302. Once the connection is established with a component in multicore network 104, application 302 may communicate with the component (e.g., send data or receive data) over the connection.

Client 304 and app info DB 306 may provide a mechanism that passes a call for connection from application 302 to operating system 308. Although client 304 and app info DB 306 are illustrated as standalone components in FIG. 3, in some implementations, client 304 and app info DB 306 may be integrated into and be part of application 302—in such implementations, application 302 may include the functionalities, of client 304 and app info DB 306, as described herein.

When client 304 receives a request for connection from application 302, client 304 uses the original app ID (provided by application 302) to look up a pseudo app ID or a traffic descriptor corresponding to application 302 in app info DB 306. Next, client 304 adds the pseudo app ID and/or the traffic descriptor to the request to obtain a modified connection request. Client 304 passes the modified request to operating system 308, which then relays the modified request (also simply referred to as the request) to modem 310. Conversely, when client 304 receives any response from a component in multicore network 104 via modem 310 and operating system 308, client 304 identifies the particular application 302 to which the response is to be forwarded and provides the response to the identified application 302 on UE 102. Once application 302 receives the response, application 302 may use the connection for communication.

In addition to functioning as an intermediary between application 302 and operating system 308 for connection requests, client 304 may also handle messages from SWORD 106 in access network 204. More specifically, from time to time, SWORD 106 may send what is herein referred to as a slice binding. A slice binding is a pair comprising the original ID of application 302 (the original app ID) and either a pseudo app ID or a traffic descriptor. The original app ID in a slice binding identifies an application 302 on UE 102. The pseudo app ID or the traffic descriptor in effect identifies the network slice 212, as the pseudo app ID or the traffic descriptor is used by modem 310 to determine, for the application 302, the network slice 212 to which the connection is to be established. That is, a slice binding maps or binds the application 302 to the network slice 212. When client 304 receives an updated slice binding from SWORD 106, client 104 replaces the current slice binding for the corresponding application 302 in app info DB 306.

When UE 102 attaches to access network 204, before client 304 can receive slice bindings from SWORD 106 for applications 302 on UE 102, client 304 registers with SWORD 106 to notify SWORD 106 of its presence and network/physical location. During its registration at SWORD 106, client 304 sends SWORD 106 all of its slice bindings 400 (FIG. 4), to enable SWORD 106 to update the slice bindings and forward any updated slice bindings 400 to client 304.

In some implementations, client 304 is pre-configured with its own traffic descriptor, a network address (e.g., DNN), its own app ID, or an APN. When client 304 is to connect with SWORD 106 for registration, client 304 sends its own connection request (which includes the app ID, the APN, the DNN, or the traffic descriptor) to modem 310 via operating system 308. When modem 310 establishes a connection to SWORD 106 based on the request, client 304 may register at SWORD 106.

Figure 4:
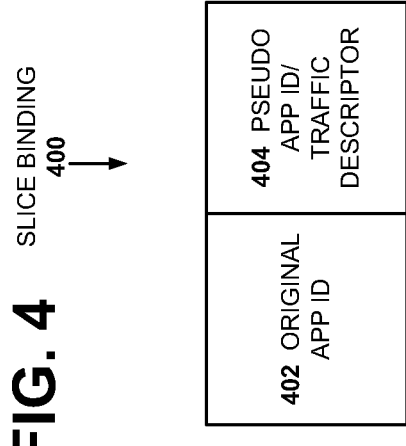
FIG. 4 illustrates an example slice binding according to an implementation.

App info DB 306 may include information pertaining to applications 302. For example, for each application 302, app info DB 306 may include an application version number, a description of the application, an application type, and a slice binding. FIG. 4 illustrates an example slice binding. As shown, slice binding 400 includes an original app ID 402 and a pseudo app ID or a traffic descriptor 404. Original app ID 402 is an ID that is originally assigned to or provided with application 302. Original app ID 402 may uniquely identify application 302. Pseudo app ID or traffic descriptor 404 may comprise an identifier that has been assigned by SWORD 106 such that modem 310 applying a URSP rule to the pseudo app ID or the traffic descriptor 404 results in modem 310 identifying a particular network slice 212.

Referring back to FIG. 3, operating system 308 may manage applications 302, services, memory, and/or other resources on UE 102. Additionally, as indicated above, operating system 308 may relay connection requests from client 304 to modem 310 and relay messages, whose destinations are applications 302, that arrive at modem 310 from multicore network 106 to applications 302.

Modem 310 may perform communication-related functions, including establishing connections between UE 102 and multicore network 104, delivering messages form/to UE 102 to/from multicore network 104, perform modulation/demodulation, perform signal processing, etc.

When modem 310 receives a connection request from applications 302 or client 304 via operating system 308, modem 310 extracts either an app ID, a pseudo app ID, or a traffic descriptor from the request. Next, modem 310 applies a URSP rule that matches the app ID, the pseudo app ID, or the traffic descriptor to identify the network slice 212 or data network 208 to which the connection is to be established from the application 302 or client 304. Thereafter, modem 310 may establish the connection to the identified network slice 212 or the identified data network 208.

URSP rules DB 312 may include URSP rules. When multicore network 104 sends updates to URSP rules to UE 102, modem 310 may store the updated URSP rules in URSP rules DB 312. Furthermore, modem 310 may access URSP rules DB 312 when modem 310 has to look up a URSP rule whose app ID or traffic descriptor matches the app ID, the pseudo app ID, or the traffic descriptor in the connection request received by modem 310 from application 302 or client 304 via operating system 308.

Figures 5, 6:
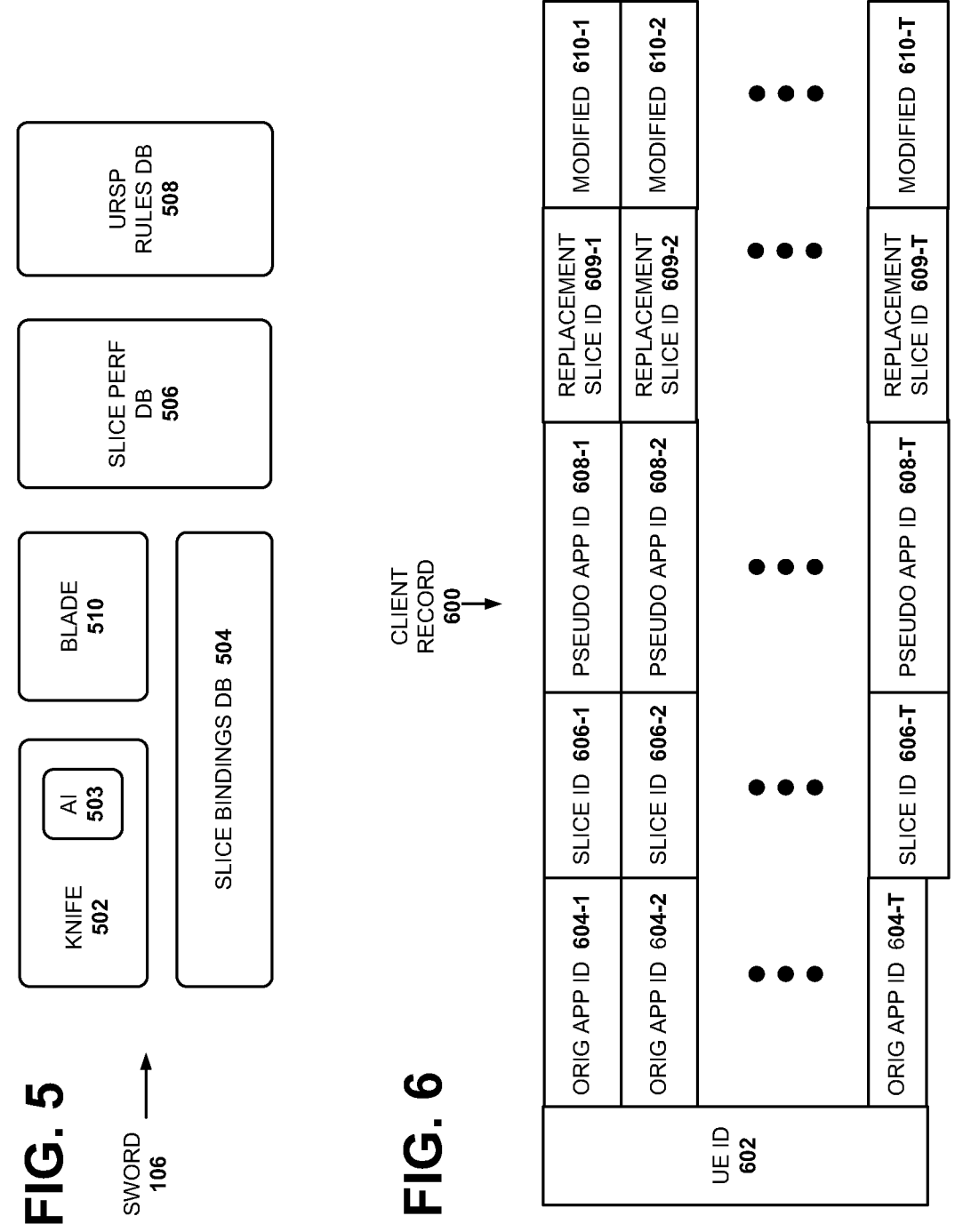
FIG. 5 illustrates example components of a Slice-Weighted Optimized Route Dealer (SWORD) in an access network, according to an implementation.
FIG. 6 depicts example field components of a record in a slice bindings information database (DB), according to an implementation.

FIG. 5 illustrates example components of SWORD 106, according to an implementation. As shown, SWORD 106 may include a Key Network Information Filtering Element (KNIFE) 502 that includes an artificial intelligence unit (AI) 503, a slice bindings DB 504 that include client records, a slice performance DB (slice perf DB) 506 that stores network slice performance data, a URSP rules DB 508, and a Bindings List and Application Data Exchange (BLADE) 510. Depending on the implementation, SWORD 106 may include additional, fewer, different, or a different arrangement of components than those illustrated in FIG. 5.

KNIFE 502 may register clients 304 of UEs 102 in response to receiving registration requests from the clients 304. When KNIFE 502 receives a registration request from client 304 which is not already registered, KNIFE 502 may create a new client record and insert the record in slice bindings DB 504. FIG. 6 depicts example field components of a client record 600 in slice bindings DB 504. As shown in FIG. 6, client record 600 may include a UE ID field 602, original app ID fields 604-1 through 604-T, slice ID fields 606-1 through 606-T, pseudo app ID fields 608-1 through 608-T, replacement slice ID fields 609-1 through 609-T, and modified fields 610-1 through 610-T. Depending on the implementation, UE record 600 may include additional, fewer, different, or a different arrangement of fields than those illustrated in FIG. 6.

UE ID field 602 may store an ID of UE 102 which is the host of the registered client 304. Examples of a UE ID include a Subscription Permanent Identifier (SUPI), a Subscription Concealed Identifier (SUCI), an International Mobile Subscriber Identity (IMSI), and a Mobile Station International Subscriber Directory Number (MSISDN). Original app ID fields 604 and slice ID fields 606 may store the original IDs of applications 302 on the UE 102 and the IDs of the corresponding networks slices 212 to which the applications 302 may connect. Because initial slice bindings that client 304 sends to KNIFE 502 at the time of registration may not include a slice ID (e.g., an S-NSSAI) for the network slice, KNIFE 502 may apply URSP rules in URSP rules DB 508 to the original app IDs or the traffic descriptors provided in the slice bindings from client 304 to obtain the slice IDs. KNIFE 502 may store the obtained slice IDs in slice ID fields 606. Pseudo app ID fields 608 may include pseudo app IDs corresponding to the applications 302 or traffic descriptors corresponding to the applications 302. Replacement slice ID field 609 may store an ID of the network slice 212 that SWORD 106 has identified for applications 302 is to connect in place of the network slice 212 identified by slice ID field 606. Modified field 610 may indicate whether pseudo app ID field 608 has been modified (i.e., the field has a new value) after the latest communication of the pseudo app ID to client 304 on the UE 102 identified by the UE ID field 602. At the time of client registration, modified fields 610 are set to NO, to indicate the field has not been modified.

Referring back to FIG. 5, in addition to handling client registration, KNIFE 502 may receive network slice performance data from network slices 212 via, for example, NEFs 714. For example, KNIFE 502 may receive network slice performance data from network slices 212-1 via NEF 714-1 and receive network slice performance data from network slices 212-2 via NEF 714-2. KNIFE 502 receives the network slice performance data through NEFs 714 since KNIFE 502 is external to core networks 206. Examples of network data include a 5G QoS Identifier, a Quality Class Identifier, a packet error rate, latency, jitter, a session drop rate, a total traffic, and a round trip time. In some implementations, KNIFE 502 may also obtain other data from other network components via NEF 714. The other data may include, for example, a Service Profile Identifier (SPID), a radio access type (RAT)/Frequency Selection Priority (RFSP), an Allocation Retention Priority, and key performance indicators (KPIs).

Upon receipt of network slice performance data, KNIFE 502 may store the network slice performance data and the other data in slice performance DB 506. KNIFE 502 may use the stored data to determine, for each UEs 102 in slice bindings DB 504, and for each of applications 302 hosted on the UE 102, whether the application 302 should be connected to a replacement network slice 212 and if so, determine the identity of the replacement network slice 212, and obtain a new pseudo app ID and/or a new traffic descriptor for the identified network slice 212. KNIFE 502 may write the obtained pseudo app ID, the obtained new traffic descriptor for the application 302, and the slice ID of the replacement network slice in an appropriate client record 600 in slice bindings DB 504.

To determine if one of the network slices 212 should replace the network slice 212 to which the application 302 has established a connection, KNIFE 502 may apply a number of criteria. The criteria may include, for example, whether a performance of the network slice 212 to which the application 302 is connected fails to meet first thresholds (e.g., thresholds set based on the SLA between the user of the UE 102 and the service provider); whether a performance of a target network slice 212 meets second thresholds; and whether a performance of a target network slice 212 exceeds performance of the network slice 212 currently connected to the application 302 by margins or thresholds. The performance may be indicated by a particular combination of network performance data, such as throughput, latency, and a dropped connection rate.

For example, assume that a latency of a connected network slice 212 (e.g., a network slice 212 to which an application 302 is connected) is 40 milliseconds and that the maximum latency threshold is 20 milliseconds (i.e., a first threshold=30 milliseconds). Furthermore assume that a latency for a target network slice 212 (e.g., a network slice 212 under consideration for having application 302 connect to) is 10 milliseconds and the minimum latency is 20 milliseconds (i.e., second threshold=20 milliseconds). In this scenario, the connected network slice 212 fails to meet a first threshold and the target network slice 212 meets the second threshold. Accordingly, KNIFE 502 selects the target network slice 212 as a replacement network slice 212 for the application 302.

In some implementations, KNIFE 502 may apply AI 503 to determine, for each UE 102 in slice bindings DB 504, and for each of applications 302 hosted on the UE 102, whether the application 302 should be connected to a different network slice 212 and if so, determine the identity of the different network slice 212, and obtain a pseudo app ID and/or a traffic descriptor for the different network slice 212. For example, assume that AI 503 is implemented as one of a machine learning component, such as an artificial neural network, a reinforcement neural network, a deep learning neural network, a convolutional neural network, or a combination of neural networks, decision trees, a forest, etc. In the training mode, AI 503 may receive as input, signals from nodes that represent network slices and signals that represent network slice performance data, along with an indication of the network slice that should be selected. AI 503 may be trained, for example, using a gradient-based approach. Once AI 503 has been trained, KNIFE 502 may provide network slice performance data to AI 503 to determine whether an application 302 on a UE 102 should connect to a different network slice 212. In other implementations, KNIFE 502 may use other ML models, such as decision trees (e.g., a variant of a gradient boosted machine learning model).

After KNIFE 502 selects the target network slice 212, KNIFE 502 may update slice bindings DB 504 based on the target network slice 212. More particularly, KNIFE 502 may perform a reverse lookup of an app ID and/or a traffic descriptor using the slice ID of the selected network slice 212 and identify a URSP rule, in URSP rules DB 508, which specifies the slice ID as the ID of the target (or destination) network slice 212. KNIFE 502 may then obtain an app ID and/or a traffic descriptor from the identified URSP rule. That is, if the destination network slice ID of the URSP rule includes the slice ID of the selected network slice 212. KNIFE 502 extracts the app ID or the traffic descriptor from the URSP rule, if available. Next, KNIFE 502 looks up a client record 600 in the slice bindings DB 504, where the value of UE ID field 602 matches a UE ID of the UE 102 that hosts the application 302. KNIFE 502 then selects a row (within the record) with the matching app ID of the application 302 and overwrites contents of the slice ID field 606, the pseudo app ID field 608, and the replacement slice ID field 609, respectively, with the following: the S-NSSAI of the current slice ID in the replacement slice ID field 609, the extracted app ID and/or the extracted traffic descriptor, and the slice ID of the selected network slice 212. Furthermore, KNIFE 502 may write YES in the corresponding modified field 610.

Continuing with FIG. 5, BLADE 510 may periodically or on demand scan slice bindings DB 504 and identify client records 600 that include modified field 610 value of YES. For each of the identified client records 600, BLADE 510 may connect to the UE 102 (if the connection has not been established) and forward updated slice bindings for each original app ID 602 whose corresponding modified field 610 has the YES value. That is, for each row with the modified field value of YES, BLADE 510 may send the updated slice binding, with a slice ID and an pseudo app ID/traffic descriptor. For each of the transmitted slice bindings, BLADE 510 may write the value NO in the modified field 610.

Figure 7:
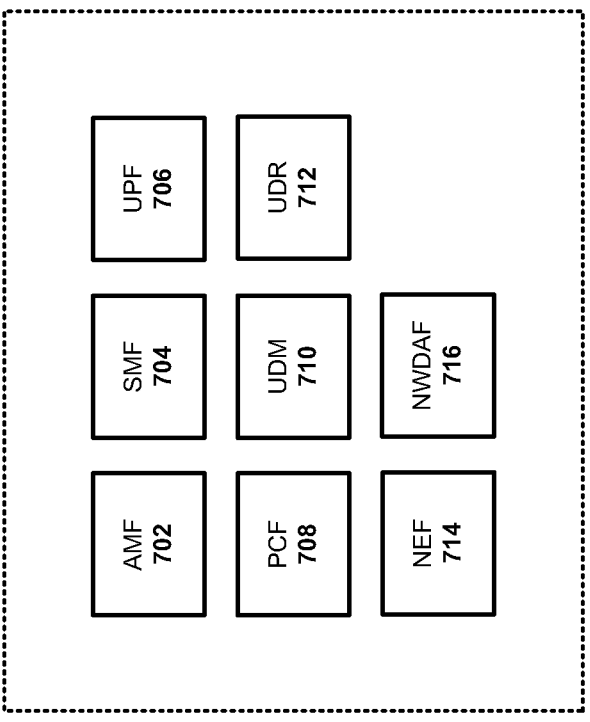
FIG. 7 shows example components of a core network, according to an implementation.

FIG. 7 shows example components of core network 206, according to an implementation. As shown, core network 206 (e.g., core network 206-1 or core network 206-2) may include an Access and Mobility Management Function (AMF) 702, a Session Management Function (SMF) 704, a user Plane Function (UPF) 706, a Policy Control Function (PCF) 708, a Unified Data Management (UDM) 710, a Unified Data Repository (UDR) 712, a NEF 714, and a Network Data Analytics Function (NWDAF) 716. Each of components 702-716 may include one or more network devices 1000 (FIG. 10) or be implemented on one or more network devices 1000. Depending on the implementation, core network 206 may include additional, fewer, and/or different 5G core network components than those illustrated in FIG. 7.

AMF 702 may perform registration management, connection management, reachability management, mobility management, lawful intercepts, Short Message Service (SMS) transport between UE 102 and a Short Message Service Function (SMSF), session management messages transport between UE 102 and SMF 704, access authentication and authorization, location services management, functionality to support non-Third Generation Partnership Program (3GPP) access networks, and/or other types of management processes.

SMF 704 may perform session establishment, session modification, and/or session release, perform Internet Protocol (IP) address allocation and management, perform Dynamic Host Configuration Protocol (DHCP) functions, perform selection and control of UPF 706, configure traffic steering at UPF 706 to guide the traffic to the correct destinations, terminate interfaces toward PCF 708, perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data.

UPF 706 may maintain an anchor point for intra/inter-RAT mobility, maintain an external protocol data unit (PDU) point of interconnect to a particular data network (e.g., data network 208), perform packet routing and forwarding, perform the user plane part of policy rule enforcement, perform packet inspection, perform lawful intercept, perform traffic usage reporting, perform Quality of Service (QOS) handling in the user plane, perform uplink traffic verification, perform transport level packet marking, perform downlink packet buffering, forward an "end marker" to a RAN node (e.g., gNB), and/or perform other types of user plane processes.

PCF 708 may support policies to control network behavior, provide policy rules to control plane functions (e.g., to SMF 704), access subscription information relevant to policy decisions, perform policy decisions, and/or perform other types of processes associated with policy enforcement. For the system for steering network traffic multicore network 104, PCF 708 may receive a set of URSP rules for network slices 212, where each URSP rule specifies the slice ID of one of the network slices 212 and the URSP rule comprise an app ID and/or a traffic descriptor. Each URSP rule in the set, when applied to the app ID or the traffic descriptor, results in a slice ID of the network slice 212. When PCF 708 obtains the set of URSP rules, PCF 708 may send the URSP rules to SWORD 106 via NEF 714 or to UE 102 via an Over-the-Air server. In response, UEs 102 and/or SWORD 106 may store the URSP rules in local databases.

UDM 710 may maintain subscription information for UEs 102, manage subscriptions, generate authentication credentials, handle user identification, perform access authorization based on subscription data, perform network function registration management, maintain service and/or session continuity by maintaining assignment of SMF 704 for ongoing sessions, support SMS delivery, support lawful intercept functionality, and/or perform other processes associated with managing user data. UDR 712 may store information that UDM 710 manages.

NEF 714, as described above, may expose network component capabilities and events internal to corresponding core networks 206 and/or data networks 208 to devices and network functions external to core networks 206. NWDAF 716 may collect analytics information associated with radio access network 204, core network 206, network slices 212, and/or data network 208. For example, NWDAF 716 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs. NWDAF 716 may be configured to provide one or more of the KPIs to SWORD 106 via NEF 714.

Figure 8:
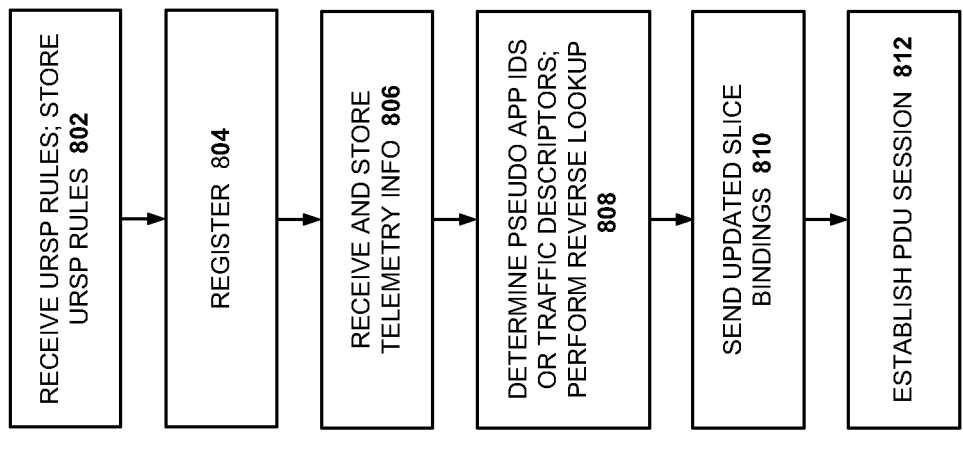
FIG. 8 is a flow diagram of an exemplary process that is associated with a system for steering network traffic for multicore networks, according to an implementation.
Figure 8:
Figure 9:
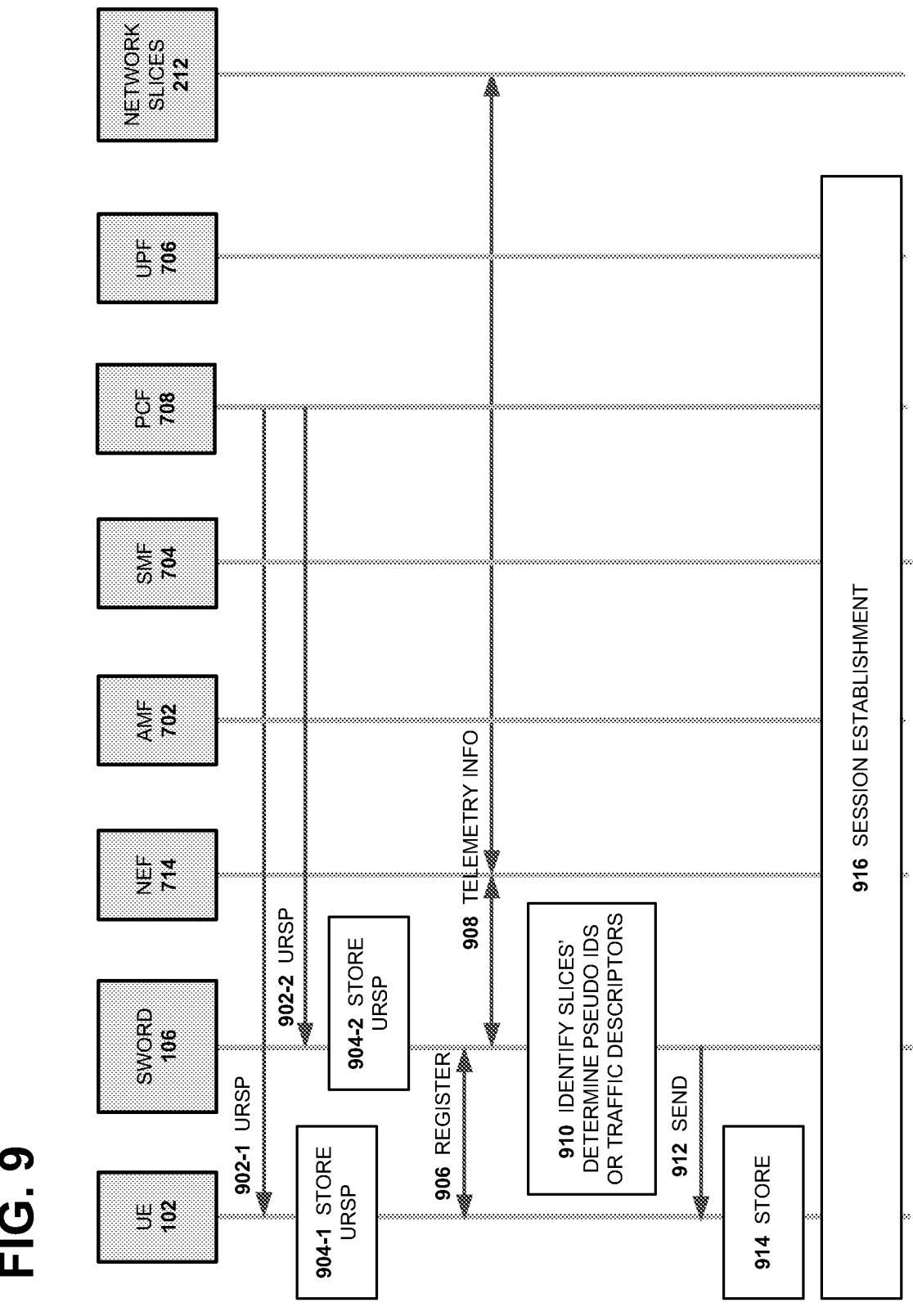
FIG. 9 illustrates exemplary messages that are exchanged by the system for steering network traffic for multicore networks, according to an implementation.

FIG. 8 is a flow diagram of an exemplary process 800 that is associated with a system for steering network traffic for multicore networks, according to an implementation. Process 800 may be performed by components the system, such as UE 102 (e.g., applications 302, client 304, app info DB 306, operating system 308, modem 310, and/or URSP rules DB 312), a MEC device in MEC cluster 211 (e.g., SWORD 106 and its components)), and/or core network 206 (e.g., components 702-716). FIG. 9 illustrates exemplary messages that are exchanged by the system during process 800.

As shown in FIG. 8, process 800 may include UE 102 and SWORD 106 receiving updated URSP rules (block 802; arrows 902-1 and 902-2). The destination network slice IDs specified by the updated URSP rules may include all slice IDs of the network slices 212, of multicore network 104, to which UE 102 may connect. Each of these URSP rules may include a corresponding app ID and/or a traffic descriptor that KNIFE 502 may obtain from the URSP rule by a reverse lookup and send to UE 102 as part of slice bindings. After the receipt of the updated URSP rules, UE 102 may store the received URSP rules in URSP rules DB 312 (block 802; block 904-1) and SWORD 106 may store the URSP rules in its own URSP rules DB 508 (block 802; block 904-2).

Process 800 may further include client 304 registering with SWORD 106 on MEC cluster 211 in access network 204 (block 804; arrow 906). During the registration, client 304 may provide SWORD 106 with a UE ID and original app IDs for applications 302. As described previously, when KNIFE 502 in SWORD 106 receives the information, KNIFE 502 may create a corresponding client record 600 in slice bindings DB 504.

In addition to handling client 304 registration, KNIFE 502 in SWORD 106 may receive telemetry information from network slices 212 via NEF 714 (block 806; arrows 908). The telemetry information may include network slice performance data. KNIFE 502 may store the received data in slice perf DB 506 (block 806). In some implementations, KNIFE 502 may also receive other data, such as KPIs from different network components, such as NWDAF 716 (not shown in FIGS. 8 and 9).

KNIFE 502 may use the stored information to determine, for each UEs 102 in slice bindings DB 504, and for each of applications 302 hosted on the UE 102, whether the application 302 should be connected to a different network slice 212 and if so, determine the identity of the different network slice 212. KNIFE 502 may also determine a pseudo app ID and/or a traffic descriptor for the different network slice 212 by performing, for example, a reverse lookup (block 808; block 910), In some implementations, KNIFE 502 may use AI 503 to perform the preceding processing. Thereafter, KNIFE 502 may write the slice ID (e.g., S-NSSAI) of the different network slice 212, the pseudo app ID, and/or the traffic descriptor for the different network slice 212 in an appropriate client record 600 in the slice bindings DB 504. In addition, KNIFE 502 may update the value of the modified fields 610 corresponding to the updated pseudo app ID fields 608 with the value YES.

With slice bindings DB 504 being updated by KNIFE 502, BLADE 510 in SWORD 106 may identify client records 600 that include modified field 610 value of YES. For each of the identified client records 600, BLADE 610 may connect to the UE 102 (if the connection has not been established) and send updated slice bindings for each original app ID 602 whose corresponding modified field 610 has the YES value (block 810; arrow 912). For each of the sent slice bindings, BLADE 510 may write the value NO in the modified field 610.

Process 800 may further include UE 102 storing the received updates to slice bindings (block 914). For example, client 304 in UE 102 may receive, from BLADE 510, the slice bindings updates via operating system 308 and modem 310 in the UE 102 and store the updated slice bindings in app info DB 306.

After UE 102 receives the updated slice bindings, application 302 may be prompted to disconnect from its current network slice and establish a new connection. The prompt may be in the form of a callback from client 304 or by BLADE 510 sending a message to an appropriate network core component (e.g., AMF 702) to modify or establish a new connection. In either case, as a consequence of the prompt, application 302 whose slice binding have been updated may initiate a connection procedure, by forwarding a new connection request to modem 310. The request may include the pseudo app ID or the traffic descriptor of the updated slice binding. When modem 310 receives the request, modem 310 may apply URSP rules in its URSP rules DB 312 to the pseudo app ID or the traffic descriptor in the request, to identify a different network slice 212. Thereafter, modem 310 may establish a new connection (e.g., a PDU session) for application 302 to the identified network slice 212 (block 812; block 916).

Figure 10:
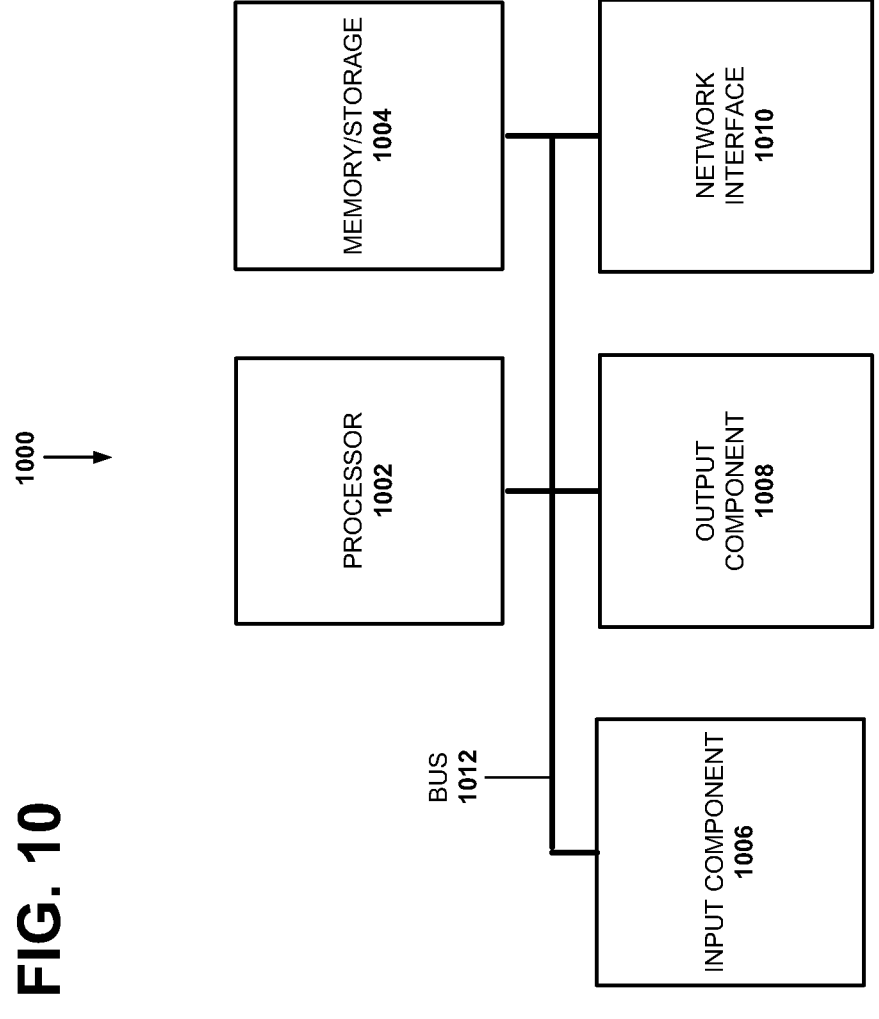
FIG. 10 depicts exemplary functional components of a network device according to an implementation.

FIG. 10 depicts exemplary components of an exemplary network device 1000. Network device 1000 may correspond to or be included in any of the devices and/or components illustrated in FIGS. 1-7 and 9 (e.g., UE 102, access network 204, core network 206, data network 208, access station 210, NFs 702-716, SWORD 106 or components in SWORD 106). In some implementations, network devices 1000 may be part of a hardware network layer on top of which other network layers and network functions (NFs) may be implemented.

As shown, network device 1000 may include a processor 1002, memory/storage 1004, input component 1006, output component 1008, network interface 1010, and communication path 1012. In different implementations, network device 1000 may include additional, fewer, different, or different arrangement of components than the ones illustrated in FIG. 10. For example, network device 1000 may include line cards, switch fabrics, modems, etc.

Processor 1002 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 1000 and/or executing programs/instructions.

Memory/storage 1004 may include static memory, such as read only memory (ROM), and/or dynamic memory, such as random access memory (RAM), or onboard cache, for storing data and machine-readable instructions (e.g., programs, scripts, etc.). Memory/storage 1004 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1004 may be external to and/or removable from network device 1000. Memory/storage 1004 may include, for example, a Universal Serial Bus (USB) memory stick, a dongle, a hard disk, off-line storage, a Blu-Ray® disk (BD), etc. Memory/storage 1004 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 1006 and output component 1008 may provide input and output from/to a user to/from network device 1000. Input/output components 1006 and 1008 may include a display screen, a keyboard, a mouse, a speaker, a microphone, a camera, a DVD reader, USB lines, and/or other types of components for obtaining, from physical events or phenomena, to and/or from signals that pertain to network device 1000.

Network interface 1010 may include a transceiver (e.g., a transmitter and a receiver) for network device 1010 to communicate with other devices and/or systems. For example, via network interface 1010, network device 1000 may communicate over a network, such as the Internet, an intranet, cellular, a terrestrial wireless network (e.g., a WLAN, WIFI, WIMAX, etc.), a satellite-based network, optical network, etc. Network interface 1010 may include a modem, an Ethernet interface to a LAN, and/or an interface/connection for connecting network device 1000 to other devices (e.g., a Bluetooth interface).

Communication path or bus 1012 may provide an interface through which components of network device 1000 can communicate with one another.

Network device 1000 may perform the operations described herein in response to processor 1002 executing software instructions stored in a non-transient computer-readable medium, such as memory/storage 1004. The software instructions may be read into memory/storage 1004 from another computer-readable medium or from another device via network interface 1010. The software instructions stored in memory/storage 1004, when executed by processor 1002, may cause processor 1002 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of actions, messages, and/or signals, have been described with reference to FIGS. 8 and 9, the order of the actions, messages, signals may be modified in other implementations. In addition, non-dependent actions, messages, and signals may represent actions, messages, and signals that can be performed, sent, and/or received in parallel and in different orders. Furthermore, each actions, messages, and signals illustrated may include one or more other actions, messages, and/or signals.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising one or more devices, in a network, configured to:
    receive network slice performance data;
    receive, from a User Equipment (UE) device, an application identifier (app ID) that identifies an application running on the UE;
    determine whether a network slice to which the UE device is connected meets one or more criteria based on the network slice performance data; and
    in response to determining that the network slice does not meet the one or more criteria:
        identify a different network slice that meets the one or more criteria;
        obtain a replacement app ID, wherein, when the replacement app ID is used as an input parameter for applying a UE Route Selection (URSP) rule, the replacement app ID matches a traffic descriptor of the URSP rule and the URSP rule outputs a slice ID of the different network slice; and
        send the received app ID and the replacement app ID to the UE device.

2. The system of claim 1, wherein the network comprises a core network, and wherein when the one or more devices receive the network slice performance data, the one or more devices receive the network slice performance data from network slices via a Network Exposure Function (NEF) in the core network.

3. The system of claim 1, wherein the network slice performance data includes at least one of:
    a Fifth Generation Quality-of-Service Identifier (5QI); or
    a latency value.

4. The system of claim 1, wherein the one or more devices are further configured to:
    receive updated URSP rules from a Policy Control Function (PCF), wherein the updated URSP rules include the URSP rule.

5. The system of claim 1, wherein the UE device is configured to:

receive the app ID and the replacement app ID from the one or more devices;
    disconnect from the network slice; and
    connect to the different network slice by using the replacement app ID.

6. The system of claim 5, wherein when the UE device connects to the different network slice, the UE device is configured to:
    apply the URSP rule to obtain the slice ID; and
    use the slice ID to establish a session with the different network slice.

7. The system of claim 1, wherein the one or more devices are configured to:
    receive, from a core network, URSP rules that include the URSP rule.

8. The system of claim 1, wherein the network includes a Radio Access Network (RAN) that comprises a Multi-Access Edge Computing (MEC) cluster, wherein the MEC cluster comprises the one or more devices.

9. The system of claim 8, wherein the RAN is coupled to at least a first core network and a second core network, and wherein a first UE device attaches to the RAN and connects to the first core network, and a second UE device attaches to the RAN and connects to the second core network.

10. The system of claim 1, wherein when the one or more devices identify the different network slice, the one or more devices are configured to:
    apply a machine learning unit or an artificial neural network to select the different network slice.

11. A method comprising:
    receiving, by one or more devices in a network, network slice performance data;
    receiving, from a User Equipment (UE) device, an application identifier (app ID) that identifies an application running on the UE;
    determining whether a network slice to which the UE device is connected meets one or more criteria based on the network slice performance data; and
    in response to determining that the network slice does not meet the one or more criteria:
        identifying a different network slice that meets the one or more criteria;
        obtaining a replacement app ID, wherein, when the replacement app ID is used as an input parameter for applying a UE Route Selection (URSP) rule, the replacement app ID matches a traffic descriptor of the URSP rule and the URSP rule outputs a slice ID of the different network slice; and
        sending the received app ID and the replacement app ID to the UE device.

12. The method of claim 11, wherein the network comprises a core network, and wherein receiving the network slice performance data includes receiving the network slice performance data via a Network Exposure Function (NEF) in the core network.

13. The method of claim 11, wherein the network slice performance data includes at least one of:
    a Fifth Generation Quality-of-Service Identifier (5QI); or
    a latency value.

14. The method of claim 11, further comprising:
    receiving updated URSP rules from a Policy Control Function (PCF), wherein the updated URSP rules include the URSP rule.

15. The method of claim 11, further comprising:
    receiving, by the UE device, the app ID and the replacement app ID from the one or more devices;

disconnecting, by the UE device, from the network slice; and connecting, by the UE device, to the different network slice by using the replacement app ID.

16. The method of claim 15, wherein connecting to the different network slice includes:

applying, by the UE device, the URSP rule to obtain the slice ID; and using, by the UE device, the slice ID to establish a session with the different network slice.

17. The method of claim 11, further comprising:

receiving, by the one or more devices, from a core network, URSP rules that include the URSP rule.

18. The method of claim 11, wherein the network includes a Radio Access Network (RAN) that comprises a Multi-Access Edge Computing (MEC) cluster, wherein the MEC cluster comprises the one or more devices.

19. The method of claim 11, wherein when identifying the different network slice includes:

applying a machine learning unit or an artificial neural network to select the different network.

20. A non-transitory computer-readable medium comprising processor-executable instructions, which when executed by one or more processors of one or more devices in a network, cause the one or more processors to:

receive network slice performance data;

receive, from a User Equipment (UE) device, an application identifier (app ID) that identifies an application running on the UE;

determine whether a network slice to which the UE device is connected meets one or more criteria based on the network slice performance data; and in response to determining that the network slice does not meet the one or more criteria, identify a different network slice that meets the one or more criteria;

obtain a replacement app ID, wherein, when the replacement app ID is used as an input parameter for applying a UE Route Selection (URSP) rule, the replacement app ID matches a traffic descriptor of the URSP rule and the URSP rule outputs a slice ID of the different network slice; and send the received app ID and the replacement app ID to the UE device.

* * * * *